B. HADLEY.
SAW SETTING MACHINE.
APPLICATION FILED APR. 19, 1909.
951,767.
Patented Mar. 8, 1910.
2 SHEETS—SHEET 2.
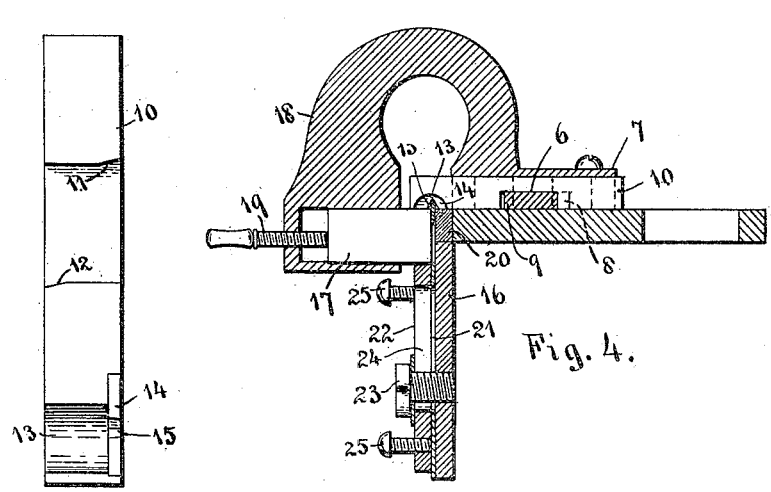
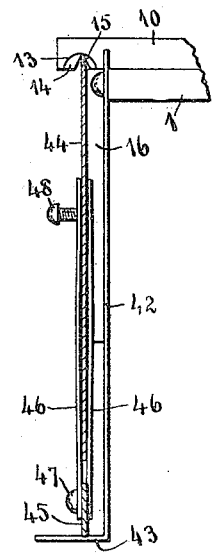
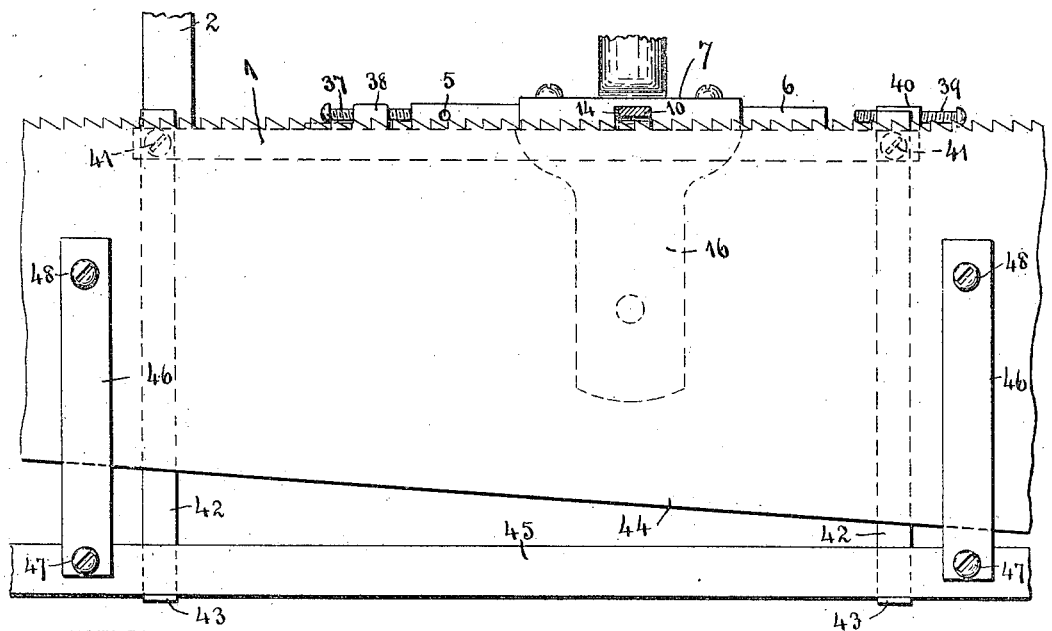
WITNESSES:
M. E. Verbeck
a. W. Foster
INVENTOR
Benjamin Hadley
BY
Eugene Owen
ATTORNEY

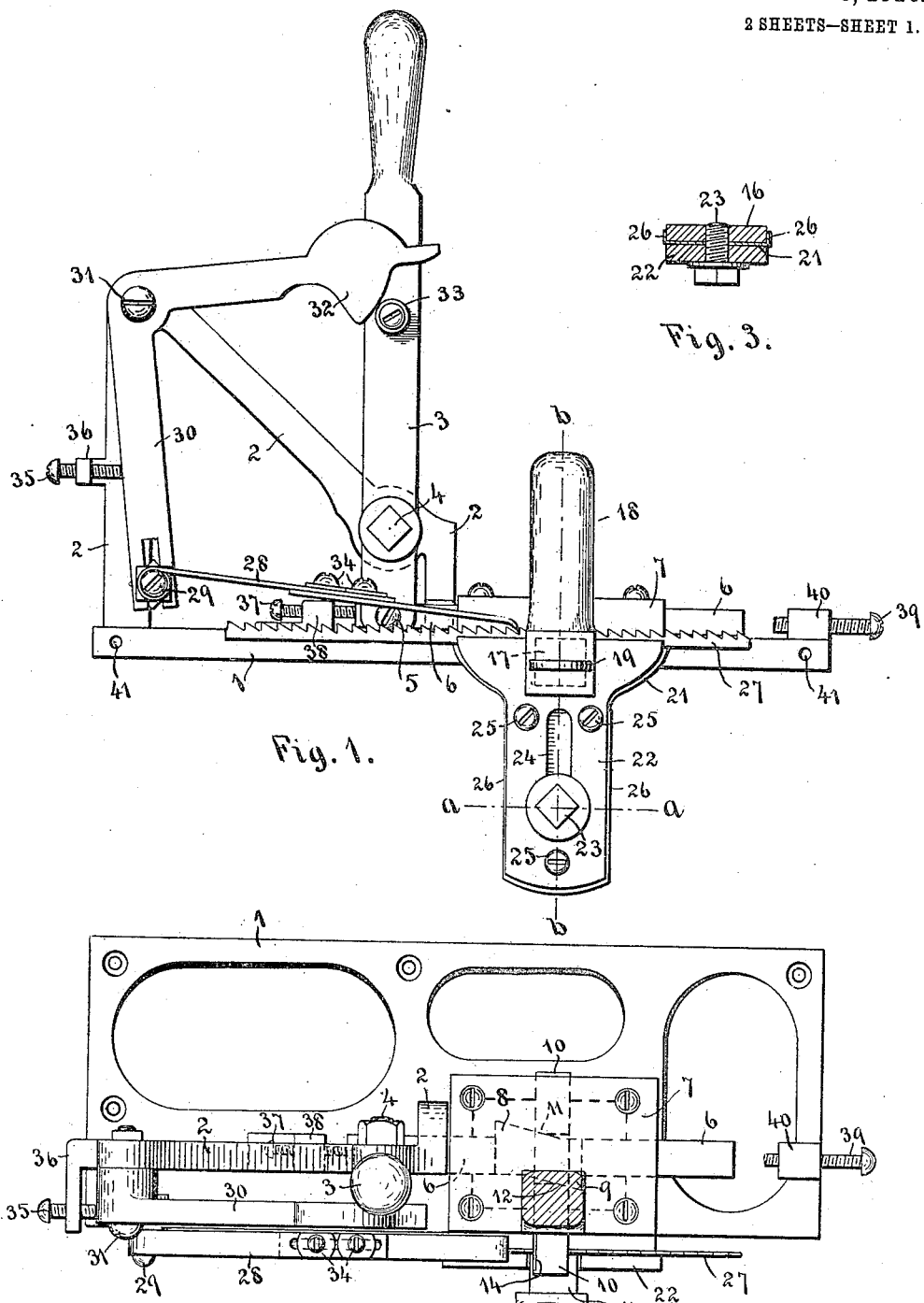

UNITED STATES PATENT OFFICE.

BENJAMIN HADLEY, OF ELMIRA, NEW YORK, ASSIGNOR OF THREE-FOURTHS TO THOMAS J. FORD AND ONE-FOURTH TO GEORGE H. FORD, BOTH OF ELMIRA, NEW YORK.

SAW-SETTING MACHINE.

951,767.  Specification of Letters Patent.  Patented Mar. 8, 1910.

Application filed April 19, 1909. Serial No. 490,921.

*To all whom it may concern:*

Be it known that I, BENJAMIN HADLEY, a citizen of the United States, residing at Elmira, in the county of Chemung and State of New York, have invented certain new and useful Improvements in Saw-Setting Machines, of which the following is a specification.

This invention relates to improvements in machines for setting the teeth of saws; and my object is to provide a machine for this purpose in which a band saw or hand saw may be placed and automatically fed to a reciprocating plunger, by the operation of a single operating lever; and further, to provide means for adjusting the throw of the plunger and of the feed mechanism for different sizes of saws and saw teeth.

I attain my objects by constructing the machine in the manner illustrated in the accompanying drawings, in which—

Figure 1 represents a side elevation of a hand operated machine embodying my improvements, as arranged for setting band saws; Fig. 2, a plan view thereof; Fig. 3, a section on the line *a—a* in Fig. 1; Fig. 4, a section on the line *b—b* in Fig. 1; Fig. 5, an underneath view of the plunger on an enlarged scale; and Figs. 6 and 7, details showing an adjustment for setting hand saws.

Like numerals designate like parts in the several views.

As herein shown, the machine consists of a bed-plate 1, adapted to be fastened upon a work bench or other suitable support, from which bed-plate a triangular standard 2 rises to support the operating mechanism. A hand lever 3 is pivotally mounted at 4 upon the standard 2, and at 5 is coupled to a reciprocating driving bar 6, adapted to slide back and forth in the guide plate 7, fastened to the top of the bed-plate. At 8 and 9, oppositely disposed wedges project from the sides of this reciprocating bar, said bar being cut down at this portion to receive the transversely reciprocating plunger 10. This plunger 10 is also guided in the block 7 and is cut upwardly from the bottom to engage the wedge portions 8 and 9 of the reciprocating bar 6, the edges of this transverse groove on the plunger being inclined at 11 and 12 to engage the wedges 8 and 9, respectively. The outward end of the plunger is transversely grooved at 13, and at one side of this groove is fastened a steel plate 14, provided with an inverted V-shaped notch 15, adapted to engage the teeth of a saw, and to bend them in one direction or the other as the plunger is reciprocated.

Projecting downwardly from the outward edge of the bed-plate 1 below the projecting end of the plunger is a hanger 16, to the outward face of which guide plates 21 and 22 are fastened by means of a set screw 23. These guide plates are slotted at 24 so that they may be raised and lowered for adjustment when the set screw 23 is loosened. The guide plate 21 will be slightly thinner than the thinnest saw blade to be operated upon in the machine, and at its upper end will be broadened, as shown in Fig. 1, to provide a substantial bearing surface across its top for the back edge of the saw blade to rest upon as it passes through the machine. This guiding edge is maintained in parallelism with the line of travel by means of guide flanges 26, which engage the vertical edges of the hanger 16, see Fig. 3. The guide plate 22 lies outside of the plate 21, and at its upper end projects above the guiding edge of plate 21, as shown in Fig. 1; so as to form, together with the upper portion of the hanger 16, a guide-way for the saw blade.

At 25 I provide adjusting screws in guide plate 22, the inward ends of which abut against the guide plate 21, whereby the plate 21 will be held up in proper position beneath the saw blade, and the plate 22 may have its upper end adjusted to permit the saw blade to slide without undue friction through the guide-way.

Below the outward end of the plunger the hanger 16 is preferably notched to receive a steel anvil block 20; and the guide plates 21 and 22 are notched to permit of the passage therethrough of an adjustable steel anvil block 17, mounted in the projecting end of a goose neck 18, carried by the guide plate 7, the thumb screw 19 being provided for the adjustment of the anvil block, as shown more clearly in Fig. 4.

As above described, the machine is adapted for setting the teeth of band saws. To insert the saw and position it in the machine, the set screw 23 will be loosened, permitting the guide plates 21 and 22 to drop. The anvil block 17 will be moved outwardly by unscrewing the thumb screw 19, after which the band saw may be inserted, and brought up into position with its teeth in line with the notch 15 of the plunger. The anvil block 17 will then be set up tightly against the blade of the saw, thereby clamping it between the anvil blocks 17 and 20; after which guide plate 21 will be moved up and adjusted against the back of the saw blade, to bring said blade into the line of travel. The outside guide plate will also be moved upward until it laps over the outward side of the saw blade; after which the set screw 23 will be set up, and the screws 25 turned in to clamp the plate 21 in position, and to move the upward end of the plate 22 outward slightly to relieve the blade from clamping pressure, or undue friction in the guide-way, the set screw 23 being eased off, if necessary, for this purpose. The anvil block 17 will then be slightly eased off so as to permit the blade to slide between it and the block 20 without sidewise motion.

For advancing the blade tooth by tooth to the plunger, as it is reciprocated back and forth through the action of the hand lever 3, and the reciprocating bar 6, I provide a pawl 28 adapted at its free end to engage the teeth, and at its other end coupled to a bell crank lever 30 pivotally mounted at 31 upon the standard 2. This lever is provided at 32 with a V-shaped cam adapted to be engaged by a roller 33, mounted upon the side of lever 3. Thus, as the lever is moved to the left from its position as shown in Fig. 1, the bell crank lever 30 will be actuated to throw the pawl 28 forward, thereby advancing the saw blade one tooth; and the parts are so adjusted that as soon as this advance has been completed, and the roller 33 has passed beyond the point of the cam 32 the plunger will be moved inward by the wedge 8 on reciprocating bar 6, thereby bending the saw tooth in that direction. When the lever 3 is moved back to the right, the bell crank lever will be again actuated to advance the saw blade, while the plunger is being moved outward into position to bend the next tooth in the opposite direction; this action being accomplished by the wedge 9 on bar 6. The weight of the cam arm of the lever 30 causes the retraction of the pawl at each oscillation of the lever 3.

For the proper adjustment of the pawl to different saw teeth, I make the pawl in two parts so that the pawl may be lengthened or shortened, there being a slot and clamping screw connection between the two parts at 34. For adjusting the swing of the lever 30 I provide an adjusting screw at 35, in a laterally projecting arm 36 on the upright 2. For adjusting the throw of the reciprocating bar 6, and thereby the travel of the plunger, I provide the set screws 37 and 39, mounted in blocks 38 and 40, respectively, attached to the bed-plate at the opposite ends of the bar 6. As so arranged the machine is capable of adjustment to any band saw, regardless of its width, thickness, or teeth dimensions.

To adapt the machine for setting hand saws, I remove the guide plates 21 and 22, and at the opposite ends of the bed-plate, at 41, attach hangers 42, provided at their lower ends with laterally projecting guide feet 43; and to the saw blade, 44, I fasten a guide bar 45 parallel to the teeth, by means of the two pairs of upright bars 46 fastened at 47 to the guide bar 45, and clamped to the blade 44 by means of the screws 48. The bar 45 will be of sufficient length to correspond with the longest saw that may be required to be set. When the saw has been placed with the guide bar 45 upon the guide feet 43, the anvil block 17 will be set up against the outward face of the saw, to hold it in place during the setting operation, and the machine will be operated in other respects the same as above described.

What I claim as my invention and desire to secure by Letters Patent is—

1. A saw setting machine comprising a bed-plate, a guideway for a saw blade at one side thereof, a driving bar mounted to reciprocate on the bed-plate parallel to the guideway, a plunger mounted on the bed-plate and adapted to be reciprocated by the driving bar transversely across the guideway, said plunger being provided with means for bending the saw teeth alternately in opposite directions when reciprocated across the guideway, means for imparting motion to the driving bar, and means for advancing the saw blade tooth by tooth to the plunger.

2. A saw setting machine comprising a bed-plate, a guideway for a saw blade at one side thereof, a driving bar provided with oppositely disposed laterally projecting wedges mounted to reciprocate on the bed-plate parallel to the guideway, a plunger mounted on the bed-plate across the driving bar in engagement with said wedges to be reciprocated thereby transversely across the guideway, said plunger being provided with means for bending the saw teeth alternately in opposite directions when reciprocated across the guideway, a lever mounted on the bed-plate to reciprocate the driving bar, and a pawl actuated by said lever to advance the saw blade tooth by tooth during each forward and back stroke of the driving bar.

3. A saw setting machine comprising a bed-plate, a guideway for a saw blade at one side thereof, a driving bar mounted to reciprocate on the bed-plate parallel to the guideway, a plunger mounted on the bed-plate and adapted to be reciprocated by the driving bar transversely across the guideway, a standard on the bed-plate, an operating lever mounted to oscillate thereon and coupled to the driving bar to impart reciprocating motion thereto, a bell crank lever mounted on the standard, a pawl at one end of said lever adapted to engage the saw teeth, a V-shaped cam on the other end of said lever positioned at one side of the operating lever, and a projection on the operating lever adapted to engage said cam to swing the bell crank lever at each forward and back stroke of the operating lever.

4. In a saw setting machine substantially as described, the combination with the bedplate of a hanger depending from one side thereof, a guide plate vertically and horizontally adjustable upon the hanger to form the outward side of a guide-way for a saw blade, an intermediate guide plate vertically adjustable upon the hanger to form the bottom of the guideway, means for fastening said plates in their several adjustments, a goose neck projecting from the bedplate across the guideway and an anvil block adjustably mounted in the gooseneck at the outward side of the guideway, the outward guideplate being notched to pass upward at each side of said block.

In testimony whereof I have affixed my signature, in presence of two witnesses.

BENJAMIN HADLEY.

Witnesses:
THOMAS J. FORD,
M. E. VERBECK.